United States Patent
Thorpe et al.

[11] Patent Number: 6,104,984
[45] Date of Patent: Aug. 15, 2000

[54] AUTOMATED METHOD OF FREQUENCY DETERMINATION IN SOFTWARE METRIC DATA THROUGH THE USE OF THE MULTIPLE SIGNAL CLASSIFICATION (MUSIC) ALGORITHM

[75] Inventors: Steven W. Thorpe, North Kingstown; Francis P. Whitsitt-Lynch, East Providence, both of R.I.

[73] Assignee: The United States of America as represented by the Secretary of the Navy, Washington, D.C.

[21] Appl. No.: 09/113,011

[22] Filed: Jun. 26, 1998

[51] Int. Cl.[7] ............................. G06F 19/00; H04B 1/06
[52] U.S. Cl. ............................. 702/75; 702/76; 702/77; 367/135
[58] Field of Search ..................... 702/74, 75, 76, 702/77; 342/162, 192; 367/135, 136, 124

[56] References Cited

U.S. PATENT DOCUMENTS

| | | | |
|---|---|---|---|
| 4,985,705 | 1/1991 | Stammler | 342/192 |
| 5,262,785 | 11/1993 | Silverstein et al. | 342/162 |
| 5,343,404 | 8/1994 | Girgis | 702/75 |
| 5,430,690 | 7/1995 | Abel | 367/135 |
| 5,440,228 | 8/1995 | Schmidt | 324/76.12 |

*Primary Examiner*—Marc S. Hoff
*Assistant Examiner*—Bryan Bui
*Attorney, Agent, or Firm*—Michael J. McGowan; Robert W. Gauthier; Prithvi C. Lall

[57] ABSTRACT

In accordance with the present invention, a method for obtaining frequency information about a given data set is realized. The method comprises the steps of providing a processing unit; inputting a raw data set into the processing unit; optionally removing at least one trend from the raw data; ordering the raw data; estimating power spectral density using an eigenanalysis approach and the inputted raw data and the ordered raw data; simultaneously estimating the power spectral density using the raw data and a periodogram; generating a time-series representation of the raw data to which curve fitting is applied; comparing the results from the power spectral density estimating steps and the time-series representation generating step to determine if any frequencies suggested by the eigenanalysis approach estimating step are valid; and generating an output signal representative of each valid frequency.

10 Claims, 3 Drawing Sheets

AUTOMATED METHOD OF FREQUENCY DETERMINATION IN SOFTWARE METRIC DATA THROUGH THE USE OF THE MULTIPLE SIGNAL CLASSIFICATION (MUSIC) ALGORITHM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a method for determining frequency content of a given set of data.

(2) Description of the Prior Art

Much effort has been exerted by analysts to find better ways to process data to obtain desired information contained therein. There are a number of patents which exemplify some of these efforts. These include Statutory Invention Registration No. H374 to Abo-Zena et al. and U.S. Pat. No. 5,262,785 to Silverstein et al.; U.S. Pat. No. 5,299,148 to Gardner et al.; U.S. Pat. No. 5,343,404 to Girgis; and U.S. Pat. No. 5,440,228 to Schmidt.

The Abo-Zena et al. disclosure is related to the identification and resolution of multiple energy sources from signals obtained from an array of sensors. The method relies on an eigenanalysis approach, in series with a minimum variance determination process. There is also an implied requirement to have enough sampled data to represent one complete cycle, or period. In addition, averages of multiple samples are used to increase the input data set.

The Silverstein et al. patent is directed to the identification of doppler frequency shift among moving targets. It utilizes the transmission of pulses and the reception of those reflected signals. The pulsed signals have known characteristics, which includes frequency. Large data sets, which span a complete period, are implied. The method for processing the information used by Silverstein et al. includes an eigenanalysis approach.

The Schmidt patent is directed towards an instantaneous frequency measurement process. It utilizes radar signals (pulses) that are processed via time delays.

The Gardner et al. patent relates to the extraction of communication signals from a signal and noise environment and the determination of the direction of the extracted signals.

The Girgis patent measures phase differences between harmonic components of two input signals.

The field of software engineering is inherently coupled to software measurement techniques, which includes a strong interest in software metric data. This software metric data becomes quite useful in a variety of ways, particularly in measuring project trends. To date, much of the data is represented as raw measurement data, i.e. not preprocessed, and graphically displayed in a standard time series plot. FIG. 1 represents one such graph and displays the Source Lines of Code (SLOC) software metric. This approach however requires the analyst to view numerous plots on an individual basis in an attempt to ascertain project issues, areas of concern, and general software development and project trends. This can become a time consuming effort, generally prone to interpretation and errors.

In the past, there have been numerous efforts to allow an analyst to obtain particular information about a given data set, such as the frequency content. Theoretically, such computations require an infinite data set. Classical estimation techniques, which are based upon Fast Fourier Transform (FFT) techniques, usually require large data sets as well.

There is still needed a method for obtaining frequency information about data so as to provide insight into the periodic nature of the data and thereby to better ascertain general project trends and directions.

SUMMARY OF THE INVENTION

Accordingly, it is an object of the present invention to provide a method for determining the frequency content of a given set of data which provides insight into the periodic nature of the data.

It is a further object of the present invention to provide a method as above which provides insight into the periodic nature of the data prior to a complete period being traversed.

It is a further object of the present invention to provide a method as above which does not require the use of large data sets.

The foregoing objects are attained by the method of the present invention.

In accordance with the present invention, a method for obtaining information about the frequency content of a given data set comprises the steps of: providing a processing unit; inputting a raw data set into the processing unit; optionally removing at least one trend from the raw data; ordering the raw data; estimating power spectral density using an eigenanalysis approach and the inputted raw data and the ordered raw data; simultaneously estimating the power spectral density using the raw data and a periodogram; generating a time-series representation of the raw data to which curve fitting is applied; comparing the results from the power spectral density estimating steps and the time-series representation generating step to determine if any frequencies suggested by the eigenanalysis approach estimating step are valid; and generating an output signal representative of each valid frequency.

BRIEF DESCRIPTION OF THE DRAWINGS

Further details of the method of the present invention, as well as further objects and advantages attendant thereto, are set forth in the following detailed description and the accompanying drawings in which like reference numerals depict like elements and wherein.

DESCRIPTION OF THE PREFERRED EMBODIMENT(S)

Figure 2:
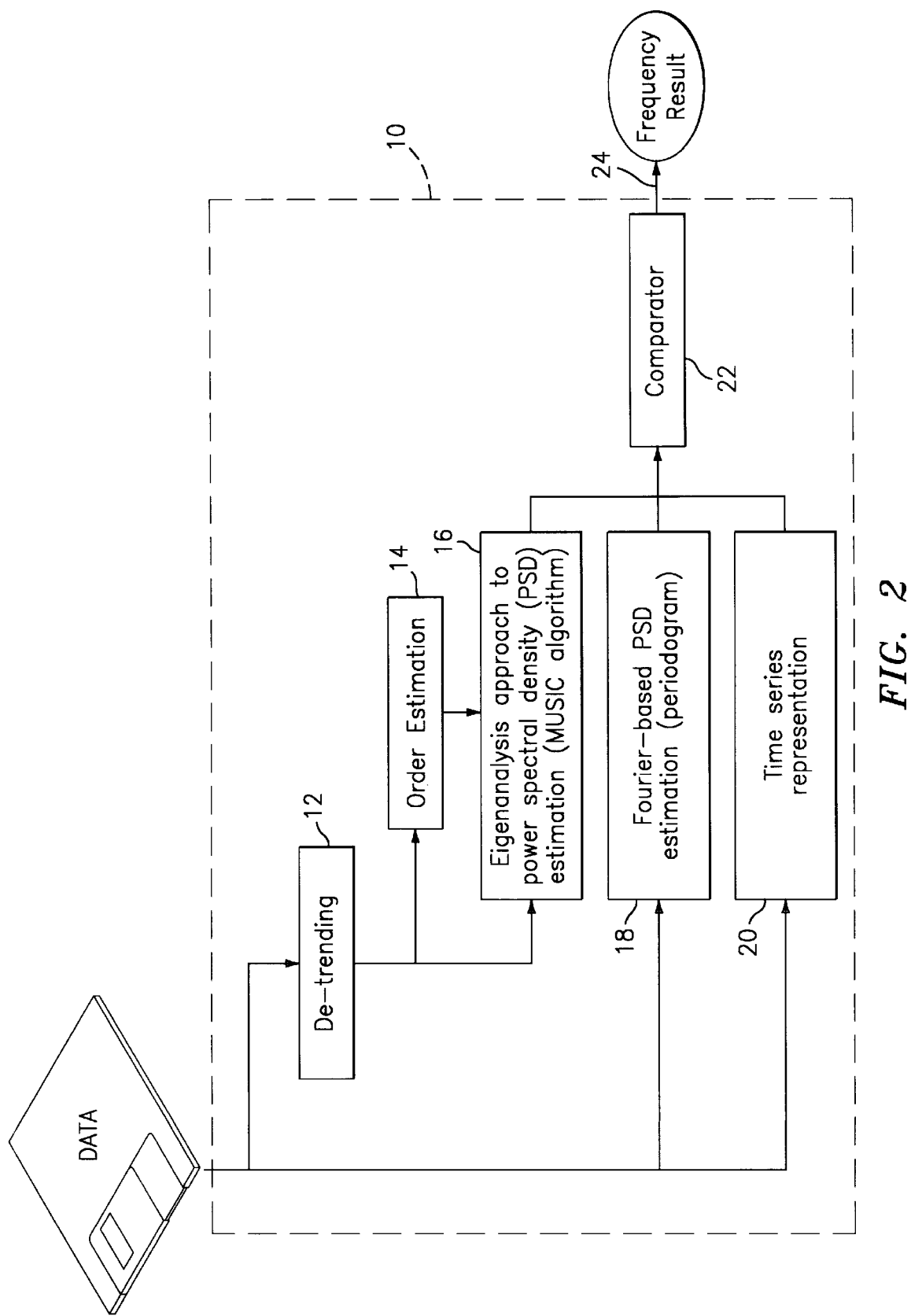
FIG. 2 is a block diagram illustrating the method of the present invention.

Referring now to FIG. 2, the method of the present invention comprises inputting a set of raw data into a processor unit 10. The processor unit may comprise any suitable computer known in the art. The data may be a set of data contained on a diskette or other readable unit.

After being inputted into the processor unit 10, the raw data is passed to a first module 12 wherein trends may be removed from the raw data, if desired. As used in the current invention, trends can be defined as known, periodic components that one wishes to remove prior to analyzing the raw data. For example, in analyzing a data set spanning several years, analysts may wish to remove the seasonal fluctuations that occur on a yearly basis. A constant, or DC component, may also be viewed as a type of trend that should be removed. Chatfield, in his book *The Analysis of Time Series: An Introduction,* Chapman and Hall, New York, New York 1980 defines a trend as a "long term change in the mean." The defining factor for detrending ultimately lies in the objectives of the analyst. Mainly, does one wish to identify and analyze a suspected trend, or does one wish to analyze the remaining data, once a suspected trend is identified and/or removed?

After passing through the module 12, the data is passed to module 14 where it is ordered. The module 14 may carry out any suitable, well known routine which determines the order of the given process (raw data). As is well known in the art, selecting a proper order is useful in accurately estimating the power spectral density (PSD).

After the raw data has been ordered in module 14, the raw data and the order of the raw data are passed to the module 16. In this module, the PSD is estimated using an eigenanalysis approach. There are a number of different algorithms which may be implemented in this module; however, it is preferred to use the Multiple Signal Classification (MUSIC) algorithm. The MUSIC algorithm is described in *Modern Spectral Estimation,* S. M. Kay, Prentice Hall, Englewood Cliffs, New Jersey 1988. The module 16 yields graphical results such as that shown in FIG. 3 from which frequency content, in particular one or more suggested frequencies, can be determined.

Figure 4:
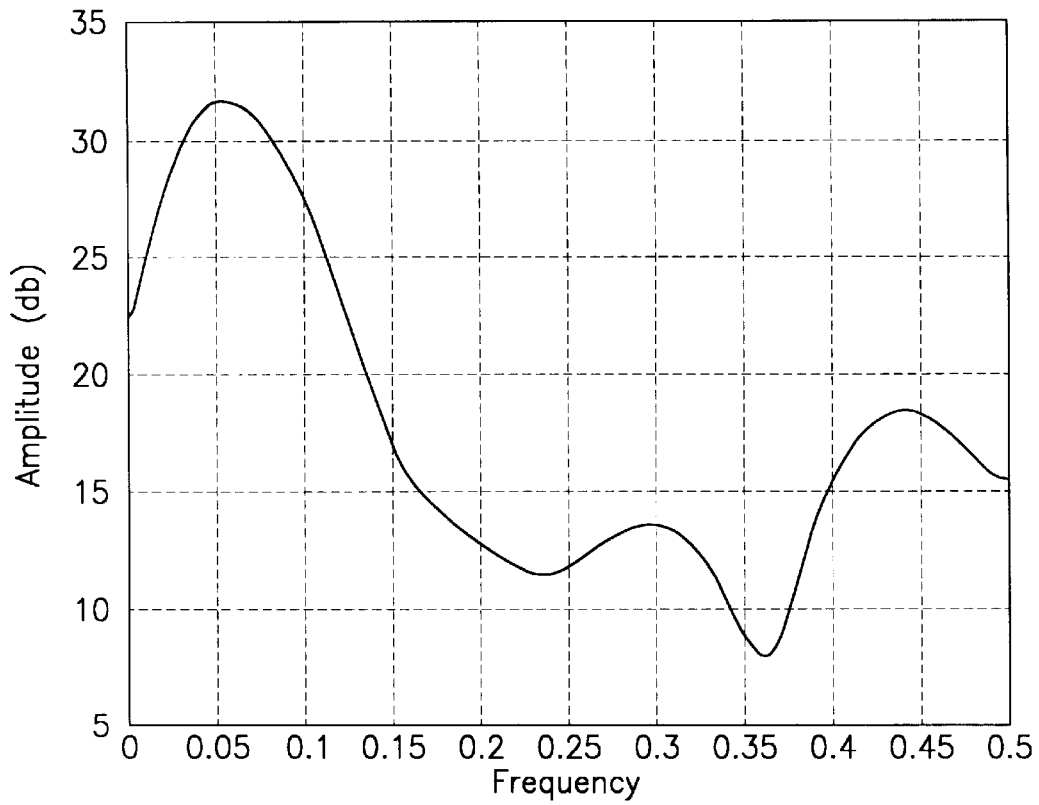
FIG. 4 is a graph showing the estimated power spectral density generated by a periodogram technique using the aforementioned data set.

The raw data is supplied to a module 18 where it is processed using another approach for estimating the PSD. While the alternative approach may be any suitable approach known in the art, it is preferred to use a periodogram—a technique well known in the art. Here too, graphical results such as that shown in FIG. 4 are obtained.

Figure 5:
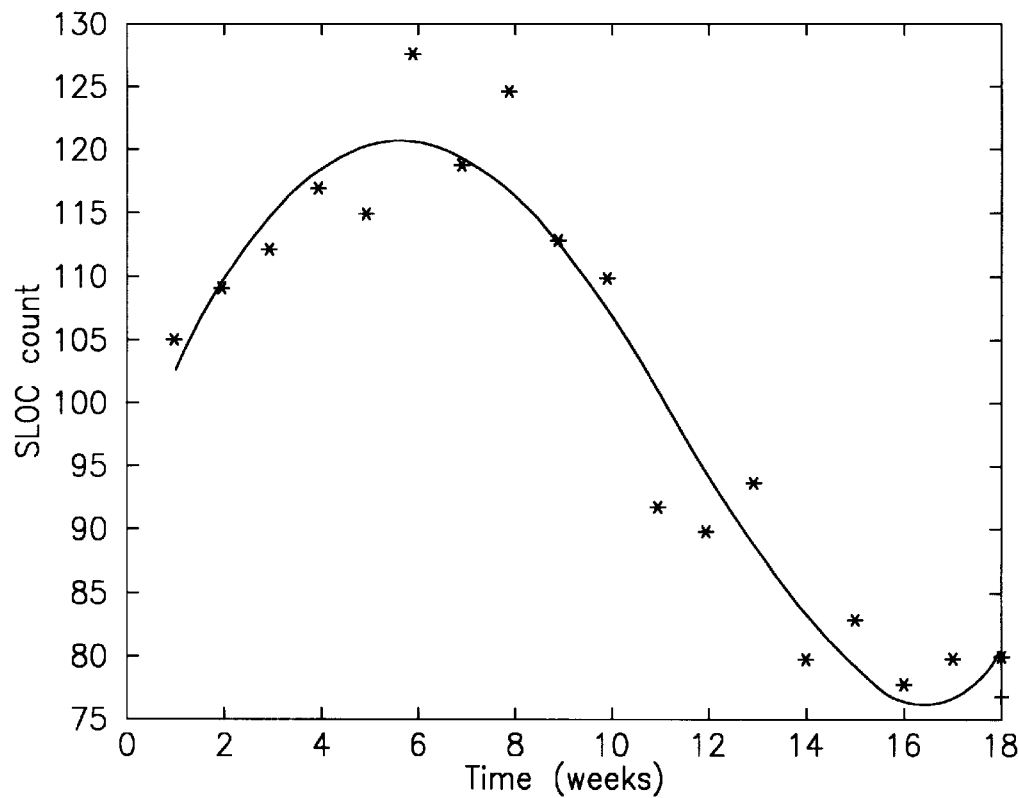
FIG. 5 is a graph showing curve fitted SLOC data using the aforementioned data set.

The raw data is also supplied to a module 20 where it is converted into a time-series representation and subjected to applied curve-fitting. Here again, graphical results such as that shown in FIG. 5 are obtained.

The graphical results generated by the modules 16, 18 and 20 are supplied to a module 22 where they are compared. First, one or more suggested frequencies are tentatively identified by examining the graphical output from module 16. Then the periodogram results from module 18 are analyzed to determine if the areas of greatest spectral energy correspond to the tentatively identified frequencies. Comparison to the periodogram gives confidence to the estimated order selection and the subsequent frequency determinations. The time-series plot generated by the module 20 is then examined to determine if the raw data could support such frequencies. The time series plot also serves to verify that the raw data does exhibit sinusoidal tendencies. If the results of the comparator module 22 indicate one or more valid frequencies, they are provided as a final output 24 in signal form. The output signal may be supplied, if desired, to a display device (not shown) such as a video monitor or a printer. Alternatively, the signal may be presented to a further module (not shown) for further processing or utilization.

The various aforementioned modules may be portions of the processing unit programmed to carry out the aforementioned tasks. The specific programming utilized by the processing unit to perform these tasks does not form part of the present invention and may be any suitable program known in the art.

If desired, the comparison amongst the outputs of the modules 16, 18 and 20 may be performed manually by an analyst.

The following example is intended to illustrate the proposed method. The raw data utilized for this example was the Source Lines of Code (SLOC) metric. This metric is a basic measure of the amount of source code developed for a typical project. The data was recorded on a weekly basis for 18 weeks and is presented in Table I.

TABLE I

| MEASURED DATA | |
|---|---|
| WEEK | SLOC COUNT |
| 1 | 105 |
| 2 | 109 |
| 3 | 112 |
| 4 | 117 |
| 5 | 115 |
| 6 | 128 |
| 7 | 119 |
| 8 | 125 |
| 9 | 113 |
| 10 | 110 |
| 11 | 92 |
| 12 | 90 |
| 13 | 94 |
| 14 | 80 |
| 15 | 83 |
| 16 | 78 |
| 17 | 80 |
| 18 | 77 |

Figure 1:
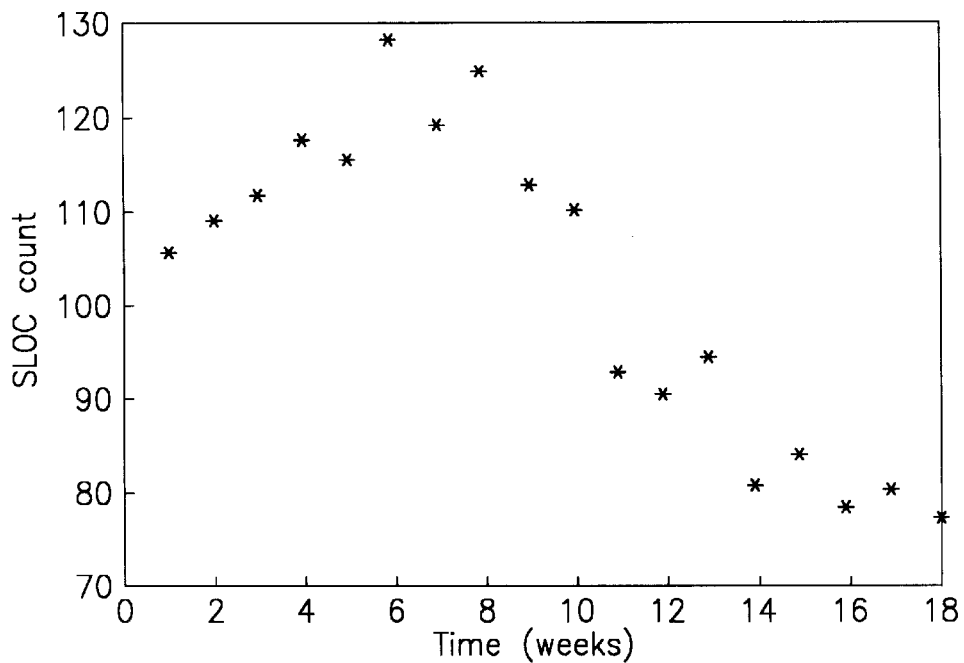
FIG. 1 is a graphical display of data in a standard time series plot.
Figure 3:
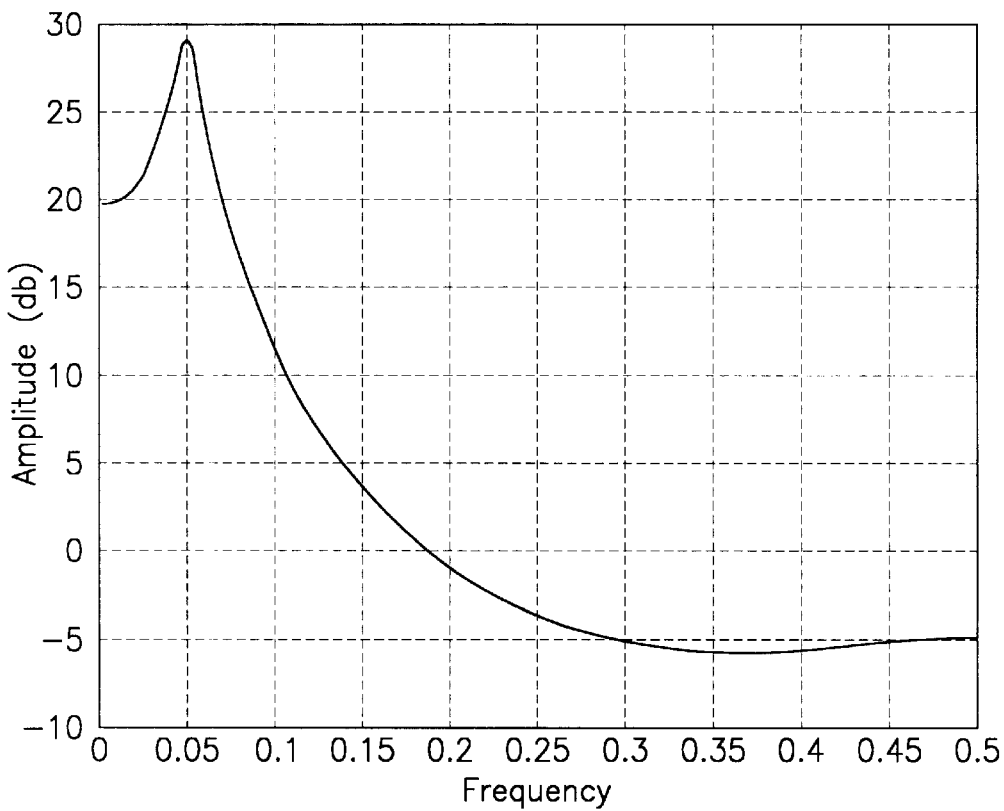
FIG. 3 is a graph showing the estimated power spectral density (PSD) generated by the multiple signal classification (MUSIC) algorithm from the data set used in one example.

The raw data presented in Table I was first de-trended in module 12 by removing the dc component which was the average value of the sequence. Next, module 14 invoked an order estimation routine which estimated the order of the process (raw data). In this example, a commercial software ordering routine was used and an order of two was obtained. The software used is called ARORDER, part of MATLAB (version 4.2) a product of MathWorks, Inc. The raw data, and the estimated order were then presented to module 16 utilizing the MUSIC algorithm. The power spectral density based upon an eigenvalue and eigenvector approach was estimated. Simultaneously, the power spectral density was estimated using a periodogram via Fast Fourier Transform techniques at module 18. A smooth curve was also fitted to the raw data at module 20. The outputs of the MUSIC algorithm, the periodogram, and the time series data were graphically obtained and are shown in FIGS. 3–5.

The results from the MUSIC algorithm, the periodogram, and the time series representation were compared (module 22) and frequency determination was made (output 24). In this example, a frequency of about 0.05 was suggested by the MUSIC PSD. A comparison with the estimate generated by the periodogram appears to support that assumption by indicating that most of the signal energy is located in the low frequency region. The time series representation which was generated provided little additional data, except to suggest an inherent sinusoidal tendency in the data. In this example, the comparisons, and resulting frequency determination were conducted by an analyst visually inspecting and interpreting the data. However, if desired, the comparison could be performed by the processing unit and thus can be fully automated. It should also be noted that the simplified example used herein utilizes only one sinusoidal signal. In practice, multiple frequencies could be inherent in the data and could be identified using the aforementioned method.

The advantage of the method of the present invention is the identification of a new piece of information, specifically the frequency content of a given set of software metric data. This new piece of information has not previously been available to analysts in assessing limited amounts of software metric data. Since frequency is defined as the reciprocal of the period, determining frequency content can provide insight into the periodic nature of the software metric data. When used in conjunction with existing trend analysis techniques, the method of the present invention will help to identify project trends and directions. Further, at times, the method of the present invention can also provide insight into the periodic nature of the data prior to a complete period being traversed. The method is particularly useful where the given data set is expected to exhibit sinusoidal behaviors.

The method described herein is further advantageous in that it does not require large data sets. That requirement is generally waived because the method utilizes the MUSIC algorithm. In some cases, as a result, the frequency content can be determined prior to a full period being traversed.

The example provided herein uses the SLOC metric as an input to the algorithm. Other software metric data sets could be used, provided they exhibit a sinusoidal tendency to some degree.

It is apparent that there has been provided in accordance with the invention described herein an automated method of frequency determination in software metric data through the use of the multiple signal classification algorithm which fully satisfies the means, objects and advantages set forth hereinbefore. While the invention has been described in connection with specific embodiments thereof, it should be apparent that those skilled in the art may arrive at other variations, alternatives, and modifications. For example, the method is not instructed to obtaining frequency information in software metric data, but can be used with data sets other than software metric data sets provided they may exhibit some degree of sinusoidal tendency. Also, other approaches besides the eigenanalysis approach may be used when the raw data is not expected to exhibit sinusoidal tendency. It is intended to embrace such variations, alternatives, and modifications as fall within the scope of the appended claims.

What is claimed is:

1. A method for obtaining frequency information about a given data set which comprises the steps of:

providing a processing unit;

inputting a raw data set into said processing unit;

generating a first estimate of the power spectral density from said raw data using a first computational technique to obtain at least one suggested frequency;

generating a second estimate of the power spectral density from said raw data set using a second computational technique;

generating a time-series representation of the raw data in said raw data set; and comparing the results of said generating steps to determine if said at least one frequency suggested by said first estimate generating step is valid.

2. The method according to claim 1 wherein said first estimate generating step comprises generating said power spectral density in graphical form using an eigenanalysis approach.

3. The method according to claim 2 wherein said first estimate generating step comprises generating said power spectral density using a multiple signal classification algorithm.

4. The method according to claim 2 wherein said second estimate generating step comprises estimating said power spectral density in graphical form utilizing a periodogram.

5. The method according to claim 1 wherein said first estimate generating step further comprises optionally removing trends from said raw data prior to said first estimate generating step, said trend removed raw data being used as said raw data for said first estimate generating step.

6. The method according to claim 5 wherein said trend removing step comprises removing periodic components.

7. The method according to claim 1 wherein said first estimate generating step further comprises obtaining an order of said raw data, said first estimate generating step using said order in said first computational technique.

8. The method of claim 1 wherein said comparing step further comprises generating an output signal representative of each valid suggested frequency.

9. A method for obtaining frequency information about a given data set which comprises the steps of:

providing a processing unit;

inputting a raw data set into said processing unit;

optionally removing at least one trend from said set of raw data;

obtaining an order of said raw data in said set;

estimating power spectral density from said raw data set and said order using an eigenanalysis approach and generating a first output representative of said estimated power spectral density;

estimating the power spectral density from said raw data set using a periodogram and generating a second output representative of said estimated power spectral density;

generating a time-series representation of the raw data and applying curve-fitting to generate a third output;

comparing said first, second and third outputs to determine if frequencies suggested by said first output are valid; and generating a fourth output signal representative of each valid frequency.

10. The method according to claim 9, further comprising performing said estimating step and said time-series representation generating step simultaneously.

* * * * *